United States Patent [19]

Pendleton

[11] 3,813,923
[45] June 4, 1974

[54] ADAPTIVE FIXTURE FOR LEAK TESTING OF CONTAINERS

[75] Inventor: Kenneth L. Pendleton, Indianapolis, Ind.

[73] Assignee: Universal Sales Engineering, Inc., Indianapolis, Ind.

[22] Filed: May 23, 1972

[21] Appl. No.: 256,171

[52] U.S. Cl. .................................. 73/49.2, 73/40.7
[51] Int. Cl. ............................................ G01m 3/32
[58] Field of Search .................... 73/49.2, 49.3, 40.7

[56] References Cited
UNITED STATES PATENTS
3,027,753 4/1962 Harder, Jr. ........................... 73/40.7
FOREIGN PATENTS OR APPLICATIONS
1,209,569 9/1959 France ................................ 73/49.3

Primary Examiner—Donald O. Woodiel
Attorney, Agent, or Firm—Woodard, Weikart, Emhardt & Naughton

[57] ABSTRACT

A fixture which is adaptive for holding a variety of different sized and shaped containers which are being subjected to leak testing. The fixture includes a pair of members movable together and apart by a pneumatic cylinder arrangement. Each member is hollow and includes a flexible diaphragm. A source of pressurized gas is used to force the diaphragms around the container being tested to support the container. The mutually facing surfaces of the diaphragms include protrusions which contact the container providing a fluid space between the container and the diaphragm. A leak testing device is then connected between the diaphragms so as to test for leakage of the container into the space between the diaphragms.

10 Claims, 4 Drawing Figures

ADAPTIVE FIXTURE FOR LEAK TESTING OF CONTAINERS

BACKGROUND OF THE INVENTION

Field of the Invention

This invention is in the field of fixtures for leak testing containers.

2. Description of the Prior Art

To leak test an automotive gasoline tank, or other similar thin wall vessel, it is considered desirable to apply a positive pressure to the inside of the tank. Although the tank may be baffled, it would generally not have sufficient rigidity to withstand the forces generated without rupturing or deforming beyond acceptable limits.

If the pressures on the inside and outside of the tank can be held equal, then no forces will be generated to deform the tank. In the adaptive fixturing technique disclosed herein, the tank is surrounded on all sides by a flexible diaphragm and the pressures are held equal on the inside and outside of the tank, without damage or deformation of the tank. Design of the diaphragms and the framework can be such that a large variety of sizes or models may be tested without changing the fixture. Disclosed in U. S. Pat. No. 3,027,753 is a leak detection device which includes a pair of opposed diaphragms.

Many of the prior art devices for detecting leaks are rigid vessels such as disclosed in the following U. S. Pat. Nos.: 3,177,704 issued to R. H. Stange; 3,399,574 issued to E. E. Seiler; and 3,431,773 issued to D. L. Calhoun.

These rigid vessels for leak testing are limited in that they may not be quickly changed or adapted to a variety of sizes of containers to be tested. Thus, the diaphragm method is desirable as compared to these prior art devices.

Another advantage of the fixture disclosed herein is that the diaphragms closely conform to the container being tested thereby reducing the time required to withdraw or pump down all of the air between the diaphragms so that a suitable leak detection device may detect gas passage from the container to the space between the diaphragms. The diaphragms disclosed herein have mutually facing surfaces which are provided with a plurality of protrusions which contact and support the container being tested in such a way so as to provide a fluid space between the diaphragms and container thereby preventing sealing of a leakage hole in the container by the diaphragms. In addition, the fixture disclosed herein is designed so as to be easily and quickly opened and closed therefore allowing testing of the containers in an assembly line fashion.

SUMMARY OF THE INVENTION

One embodiment of the present invention is an apparatus for leak testing a container comprising a first member having a first recess, a second member having a second recess mutually opposed and facing the first recess, a first flexible diaphragm sealingly mounted to the first frame and extending across the first recess being spaced from the inside surface of the first recess defining a first pressure chamber therebetween, a second flexible diaphragm sealingly mounted to the second frame and extending across the second recess being spaced from the inside surface of the second recess defining a second pressure chamber therebetween, first means connected to the first member operable to move the first member away from the second member to allow insertion of the container between the first diaphragm and the second diaphragm, and to move the first member towards, against and in sealing engagement with the second member defining a sealed container receiving enclosure, second means connected to the first member and the second member and in communication with the first chamber and the second chamber being operable to pressurize the first chamber and the second chamber and force the first diaphragm and the second diaphragm to conformingly fit around and support the container, and third means in communication with the container receiving enclosure being operable to detect fluid leakage from the container to the enclosure.

It is an object of the present invention to provide a new and improved fixture for leak testing.

It is a further object of the present invention to provide a leak testing device which will accept a variety of different shaped and sized containers.

In addition, it is an object of the present invention to provide a leak testing device which allows for rapid leakage testing of containers and which has a minimum pump down time.

Related objects and advantages of the present invention will be apparent from the following description.

DESCRIPTION OF THE PREFERRED EMBODIMENTS

Figure 1:
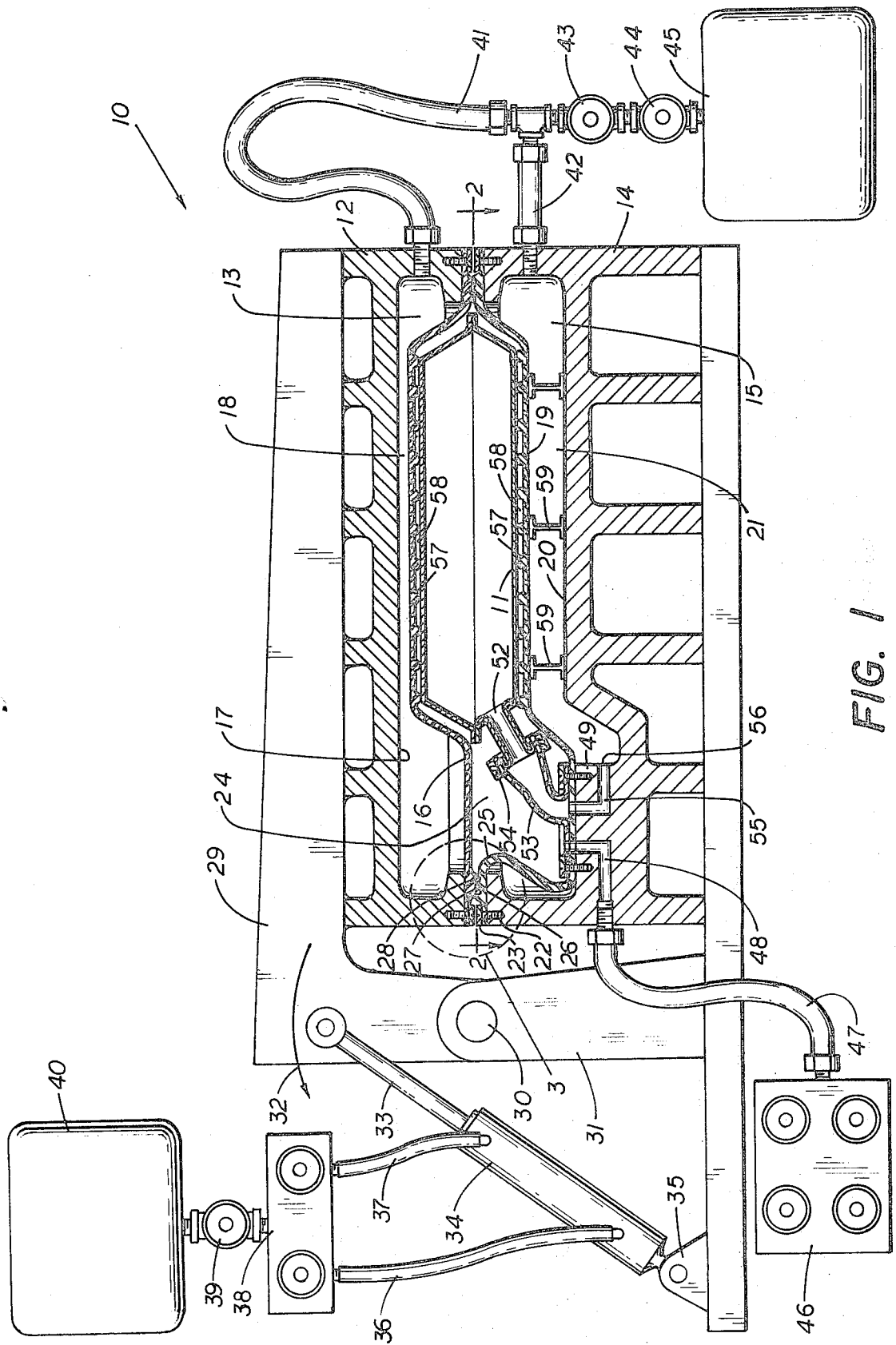
FIG. 1 is a cross sectional view of a fixture for leak testing incorporating the present invention taken along the line 1—1 of FIG. 2 and viewed in the direction of the arrows.

For the purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring more particularly to FIG. 1, there is shown an apparatus 10 for leak testing a container 11. Apparatus 10 includes a top frame 12 having a recess or hollow portion 13. The apparatus includes a second frame 14 which has a recess or hollow portion 15. Hollow portion 15 is mutually opposed to and faces hollow portion 13. A first flexible diaphragm 16 is sealingly mounted to frame 12 and extends across hollow portion 13. Diaphragm 16 is spaced from the inside surface 17 of frame 12 defining a first pressure chamber 18 between surface 17 and diaphragm 16. A second flexible diaphragm 19 is sealingly mounted to frame 14 and extends across hollow portion 15. Diaphragm 19 is spaced from the inside surface 20 of frame 14 defining a second pressure chamber 21 between surface 20 and diaphragm 19.

Figure 2:
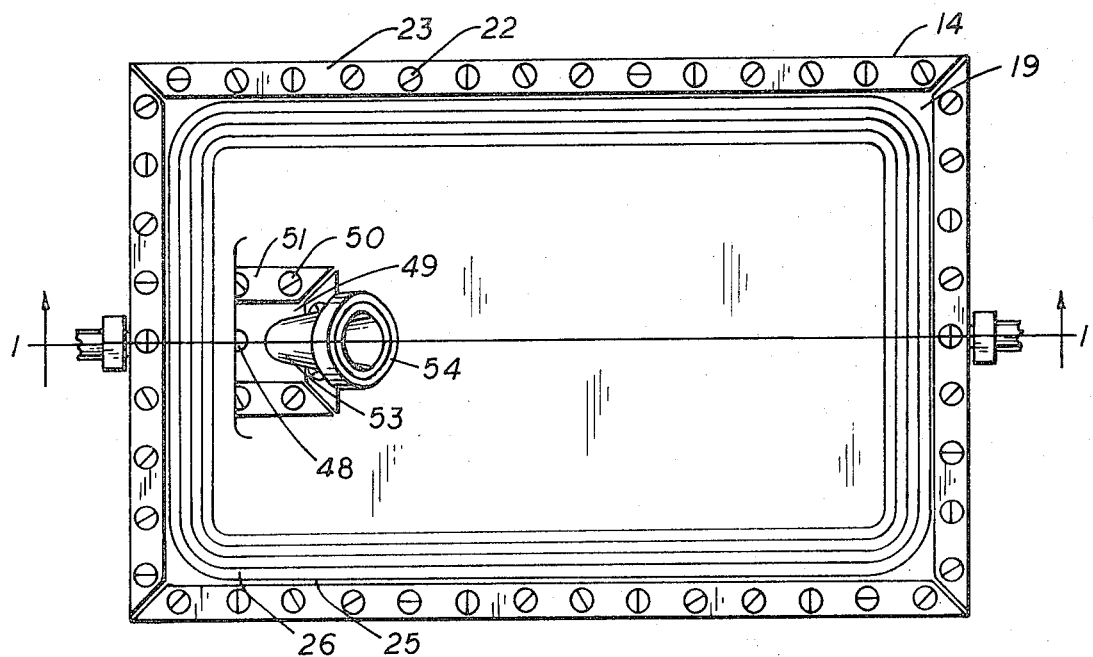
FIG. 2 is a cross sectional view taken along the line 2—2 of FIG. 1 and viewed in the direction of the arrows.

Frames 12 and 14 may take a variety of shapes and configurations such as circular or rectangular. FIG. 2 is a cross section taken along the line 2—2 of FIG. 1 and illustrating one particular embodiment of the configuration As shown in FIG. 2, frame 14 has a generally rectangular shape as does diaphragm 19. Diaphragm 19 is secured to frame 14 by a plurality of conventional fasteners 22 which extend through strips positioned atop diaphragm 19. Fasteners 22 extend through strips 23 and are threadedly received by frame 14. Diaphragm 16 is secured to frame 12 in a similar manner utilizing a plurality of fasteners which extend through strips adjacent diaphragm 16. Both diaphragms are made from a material such as rubber, and thus the small strips are required so as to prevent the heads of the fasteners from damaging the diaphragm. The fasteners are secured tightly so as to effect a seal respectively between diaphragm 16 and frame 12 and diaphragm 19 and frame 14. Thus, the first pressure chamber 18 and the second pressure chamber 21 are prevented from leaking between the joints of the diaphragm and the frames. Each diaphragm has a circumferential edge portion which is fixedly secured to its respective frame by the strips and fasteners. Each edge portion has mating surfaces which contact and seal together forming enclosure 24 for receiving container 11 when the first frame is moved against the second frame. The mating surfaces include protruding ridges which extend continuously and circumferentially with the edge portion. For example, diaphragm 19 has a top surface 25 (FIG. 3) with a plurality of circumferentially extending ridges 26 which extend into valleys 27 formed between the ridges 28 of the top diaphragm 16. The ridges on the top diaphragm are positioned so as to protrude into the valleys formed by the ridges on the lower diaphragm. Thus, the ridges on the top diaphragm and lower diaphragm are positioned adjacent each other when the frames are closed to result in a seal between the diaphragms.

Arm 29 (FIG. 1) is pivotally mounted about pivot pin 30 to base member 31. Frame 12 is fixedly secured to and depends from arm 29 and may be pivoted in the direction of arrow 32 by retracting piston rod 33 of pneumatic cylinder 34. Cylinder 34 is pivotally mounted to mount 35. The pneumatic cylinder includes a pair of air lines 36 and 37 which are connected through valve 38 and regulator 39 to a source of pressurized air 40. Thus, by operating valve 38, the piston rod 33 is caused to withdraw and extend thereby respectively pivoting member 12 in the direction toward arrow 32 and a direction opposite of arrow 32. In this manner, the first frame is caused to open and close with respect to the second frame to facilitate the insertion and removal of the container being leak tested. As the piston rod 33 is caused to extend, arm 29 and member 12 are pivoted in a direction opposite of arrow 32 so as to move frame 12 towards, against and in sealing engagement with frame 14 defining the sealed container receiving enclosure 24.

Figure 3:
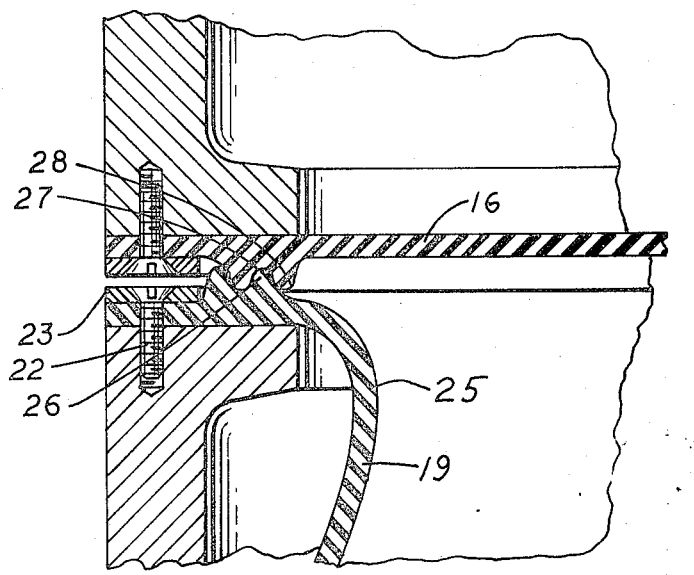
FIG. 3 is a fragmentary enlarged view of the area enclosed by the circle identified by item 3 of FIG. 1.

Tubing 41 and 42 are connected respectively to frames 12 and 14 so as to communicate respectively with chambers 18 and 21. Tubing 41 and 42 are connected together through valve 43 and regulator 44 to a source of pressurized gas 45. Thus, by opening valve 43 and allowing the source of pressurized gas to communicate with chambers 18 and 21, the chambers are pressurized so as to force diaphragm 16 and diaphragm 19 to conformingly fit around and support container 11. As a result, the volume of gas within enclosure 24 is minimized and the pump down time is reduced. A leak detection device 46 is connected by tubing 47 which in turn is connected to frame 14 and its passage 48 which opens into enclosure 24 between diaphragms 16 and 19. Frame 14 has an upraised boss portion 49 with the bottom diaphragm 19 secured therearound by conventional fasteners 50 (FIG. 3). Small strips 51 are positioned near the edge of boss 49 so as to prevent fasteners 50 from damaging the diaphragm. The leak detection device 46 is operable to detect fluid leaks from container 11 into enclosure 24. In the embodiment shown in FIG. 1, the container 11 is pressurized at the same pressure as chamber 21. Typically, a container such as an automobile gas tank is provided with a fill tube 52. A hollow neck 53 protrudes from boss 49 and has a connector 54 at its top end for sealingly engaging fill tube 52. Neck 53 is in communication with passage 55 which opens through aperture 56 into chamber 21. As a result, the interior of container 11 is in fluid communication with pressure chamber 21.

A plurality of protrusions 57 are provided on each diaphragm. The protrusions are positioned on the mutual facing surfaces of the diaphragms so as to contact and support the container. A fluid space 58 is provided between the container and each diaphragm so as to prevent the main body of the diaphragm from contacting and sealing any leakage holes in container 11. A plurality of rigid members or I-beams 59 are fixedly mounted to frame 14 having top portions upon which the bottom diaphragm 19 may rest. Although members 59 are positioned within pressure chamber 21, they are not physically attached to diaphragm 19. Each member 59 is provided with apertures to allow fluid communication between the spaces between members 59 and the rest of chamber 21.

It should be noted that the pivot axis of pin 30 is coplanar with the mating and sealing surfaces of frames 12 and 14 which are formed by ridges 26 and 28. Many variations are contemplated and included in the embodiment shown in FIG. 1. For example, each I-beam 59 may have a different height so as to support the bottom diaphragm according to the size and configuration of the testing apparatus 10. Another variation would be to utilize O-rings extending around the circumference of frames 12 and 14 in lieu of ridges 26 and 28 for sealing the members together. Protrusions 57 may be made from a variety of materials, such as metal, plastic or rubber. The protrusions are spaced sufficiently close to provide the necessary support to the walls of container 11 and are hard enough not to plug a leak point. The air space surrounding the container 11, created by the protrusions, can then be evacuated or left at atmospheric pressure according to the dictates of the leak test procedure being utilized. For example, conventional testing devices 46 are currently on the market for highly sensitive leakage testing. In these models, typically a vacuum would be pulled on enclosure 24. Since the interior of container 11 is at the same pressure as the pressure within chamber 21, any leakage of the container will force gas from within the container to the space between the diaphragms so as to be detected by device 46. Such a commercial device might be The Ion Mass Leak Detector, model number 351 available from Industrial Dynamics Corporation, Indianapolis, Ind.

In one embodiment, the container being tested was not provided with a fill neck but was a completely sealed unit. In this case, aperture 56 is plugged and a vacuum is drawn on the space between the diaphragms so as to allow any leakage from the container to pass between the diaphragms and out through passage 48 to device 46. Device 46 might be a flow detector, a mass spectrometer, a halogen detector, a differential pressure cell tester, or Ion mass detector.

Figure 4:
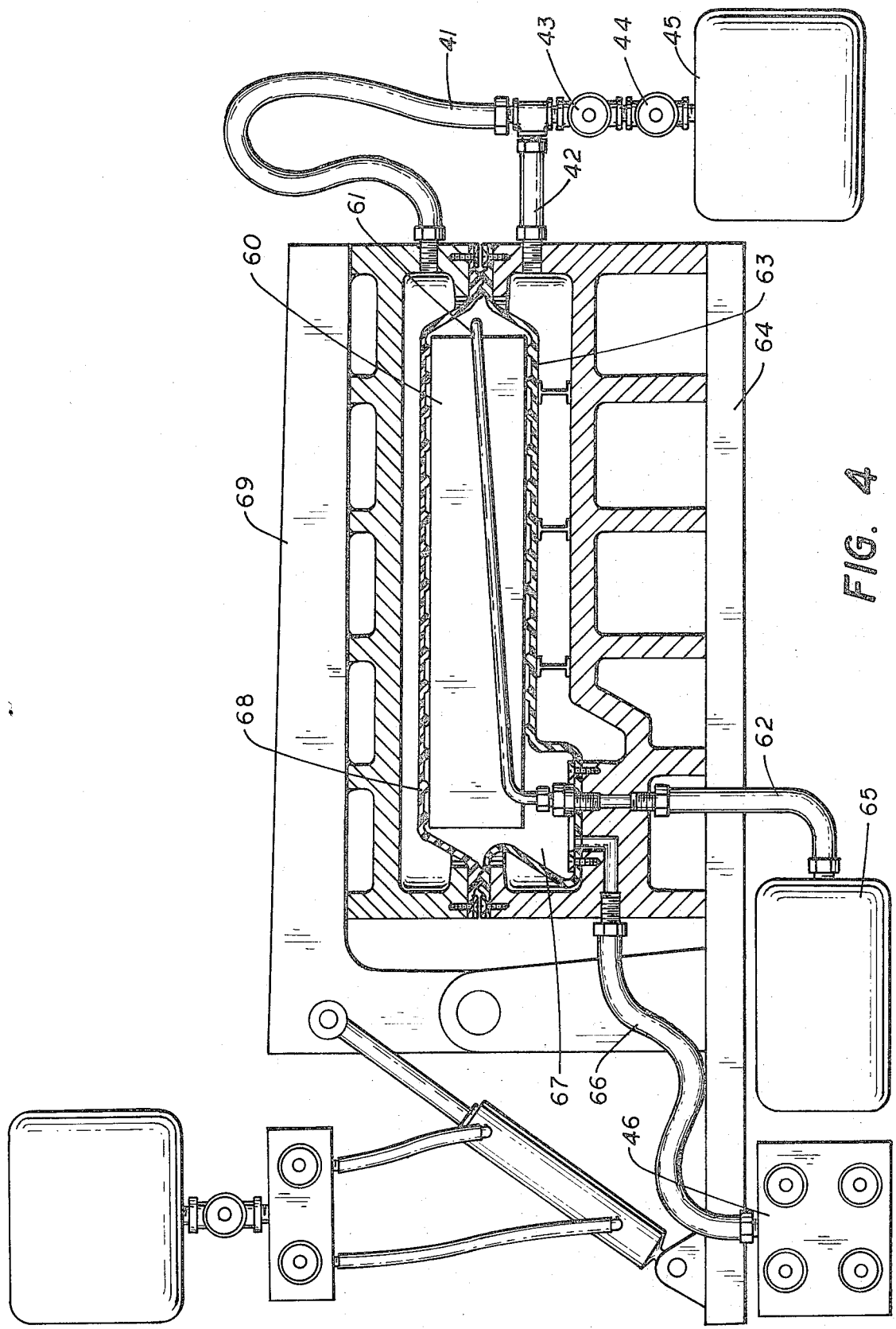
FIG. 4 is the same view as FIG. 1 only showing a different embodiment.

In FIG. 4, an alternate embodiment of the invention is shown in a view similar to FIG. 1. The fixture shown in FIG. 3 is utilized to test air conditioner evaporation cores 60 which have a return line 61. The return line is connected to tube 62 which extends through the bottom diaphragm 63 and through the bottom member 64 to a source of pressure 65 which may be a source of air, helium gas or halogen gas. A second tube 66 extends through the bottom diaphragm 63 and communicates with the enclosure 67 receiving the evaporation core 60. Tube 66 is connected to the leak test device 46. The bottom diaphragm 63 and the top diaphragm 68 are connected to the bottom member 64 and the top member 69 in a manner identical to that described for the diaphragm and frames shown and described for FIG. 1. Likewise, member 69 is caused to close and open by a pneumatic cylinder in a manner identical to that described for FIG. 1. Tubing 42 and tubing 41 are connected to valve 43 and regulator 44 to a source of pressurized gas 45 in a manner identical to that described in FIG. 1 thereby forcing the top diaphragm 68 and bottom diaphragm 63 to conformingly fit around the evaporation core 60 to support the core and reduce pump down time. In addition, the diaphragms have mutually facing surfaces with protrusions thereon to support and hold the evaporation core. It should be noted that tube 62 is mounted to member 64 and extends exteriorly of member 64 and through the second diaphragm for connecting to return line 61.

When testing thin wall pressure vessels, as previously explained, it is desirable to pressurize the interior of the vessel so as to accurately and quickly determine any leakage points. Thin wall vessels under internal pressure will tend to balloon and rupture and therefore, it is desirable to hold the vessel with a conformingly fitting diaphragm which is forced against the vessel by external pressure. It will be obvious from the above description that the present fixture allows for a high production assembly line leak testing of thin walled vessels. It will be further obvious from the above description, that the adaptive fixture allows for testing of a variety of differently sized and configured vessels. It will also be obvious, that the adaptive fixture described herein minimizes the volume of space around the container being tested so as to minimize the pump down time.

While the invention has been illustrated and described in detail in the drawings and foregoing description, the same is to be considered as illustrative and not restrictive in character, it being understood that only the preferred embodiments have been shown and described and that all changes and modifications that come within the spirit of the invention are desired to be protected.

The invention claimed is:

1. An apparatus for leak testing a container comprising:
   a first member having a first recess;
   a second member having a second recess mutually opposed and facing said first recess;
   a first flexible diaphragm sealingly mounted to said first member and extending across said first recess being spaced from the inside surface of said first recess defining a first pressure chamber therebetween;
   a second flexible diaphragm sealingly mounted to said second member and extending across said second recess being spaced from the inside surface of said second recess defining a second pressure chamber therebetween;
   first means connected to said first member operable to move said first member away from said second member to allow insertion of said container between said first diaphragm and said second diaphragm, and to move said first member towards, against and in sealing engagement with said second member defining a container receiving enclosure;

second means connected to said first member and said second member and in communication with said first chamber and said second chamber being operable to pressurize said first chamber and said second chamber and force said first diaphragm and said second diaphragm to conformingly fit around and support said container; and,
   third means in communication with said container receiving enclosure being operable to detect fluid leakage from said container to said enclosure;
   a plurality of protrusions on the mutually facing surfaces of said first diaphragm and said second diaphragm, said protrusions contact and support said container providing a fluid space between said container and said first diaphragm and said second diaphragm;
   rigid members mounted to said second member and positioned in said second recess having top portions upon which said second diaphragm rests; and wherein:
   said first means includes a base and an arm pivotally mounted to said base, said first member is fixedly secured to said arm, said first means further includes a fluid cylinder with an extendable piston rod pivotally connected to said arm; and further comprising:
   fourth means mounted on said apparatus and connected to said container being operable to pressurize said container.

2. The apparatus of claim 1 wherein:
   said arm has a pivot axis which is co-planar with the mating and sealing surfaces of said first member and said second member.

3. The apparatus of claim 1 wherein:
   said second member includes a hollow neck mounted thereto and a passage leading from said neck opening into said second pressure chamber, said neck is positioned in said container receiving enclosure for connecting to a fill tube on said container allowing fluid communication between said second pressure chamber to the interior of said container.

4. The apparatus of claim 3 wherein:

said second means includes tubing connected to a source of pressurized gas and to said first member and said second member;

said fluid cylinder is a pneumatic cylinder.

5. The apparatus of claim 1 wherein:

said first diaphragm and said second diaphragm have circumferential edge portions fixedly secured respectively to said first member and said second member, said portions have mating surfaces which contact and seal together forming said enclosure when said first member is moved against said second member.

6. The apparatus of claim 5 wherein:

said mating surfaces include protruding ridges which extend continuously and circumferentially with said edge portion.

7. The apparatus of claim 6 and further comprising:

a hollow neck mounted to said second member and extending exteriorly of said second member and through said second diaphragm for connecting to said container.

8. An apparatus for leak testing a container comprising:

a first member having a first recess;

a second member having a second recess mutually opposed and facing said first recess;

a first flexible diaphragm sealingly mounted to said first frame and extending across said first recess being spaced from the inside surface of said first recess defining a first pressure chamber therebetween;

a second flexible diaphragm sealingly mounted to said second frame and extending across said second recess being spaced from the inside surface of said second recess defining a second pressure chamber therebetween;

first means connected to said first member operable to move said first member away from said second member to allow insertion of said container between said first diaphragm and said second diaphragm, and to move said first member towards, against and in sealing engagement with said second member defining a container receiving enclosure;

second means connected to said first member and said second member and in communication with said first chamber and said second chamber being operable to pressurize said first chamber and said second chamber and force said first diaphragm and said second diaphragm to conformingly fit around and support said container; and, third means in communication with said container receiving enclosure being operable to detect fluid leakage from said container to said enclosure;

fourth means mounted on said apparatus for connecting to said container being operable to allow fluid pressurization of the interior of said container at a higher pressure than existing in said container receiving enclosure.

9. The apparatus of claim 8 wherein:

said fourth means includes a hollow neck with a first passage extending therethrough, said neck is connected to said second member, said second member has a second passage aligned with said first passage and leading from said neck and opening into said second pressure chamber, said neck is positioned in said container receiving enclosure for connecting to a fill neck on and opening into the interior of said container allowing fluid communication from said second pressure chamber through said second passage and said first passage to the interior of said container.

10. The apparatus of claim 8 wherein:

said fourth means includes a hollow neck with a first passage extending therethrough, said neck is connected to said second member which has a second passage aligned with said first passage and leading from said neck and connected to an external source of pressure, said neck is positioned in said container receiving enclosure for connecting to a fill neck on and opening into the interior of said container allowing fluid pressurization from said external source of pressure, through said second passage and said first passage to the interior of said container.

* * * * *

UNITED STATES PATENT OFFICE
CERTIFICATE OF CORRECTION

Patent No. 3,813,923  Dated June 4, 1974

Inventor(s) Kenneth I. Pendleton

It is certified that error appears in the above-identified patent and that said Letters Patent are hereby corrected as shown below:

Please change the inventor's middle initial from "L" to --I--.

Signed and sealed this 1st day of October 1974.

(SEAL)
Attest:

McCOY M. GIBSON JR.
Attesting Officer

C. MARSHALL DANN
Commissioner of Patents